(12) United States Patent
Rohrbach et al.

(10) Patent No.: US 11,525,017 B2
(45) Date of Patent: Dec. 13, 2022

(54) MULTI-REACTOR SLURRY POLYMERIZATION PROCESS

(71) Applicant: Basell Polyolefine GmbH, Wesseling (DE)

(72) Inventors: Peter Rohrbach, Ingolstadt (DE); Juergen Perzlmeier, Neustadt/Donau (DE)

(73) Assignee: Basell Polyolefine GmbH, Wesseling (DE)

( * ) Notice: Subject to any disclaimer, the term of this patent is extended or adjusted under 35 U.S.C. 154(b) by 807 days.

(21) Appl. No.: 16/473,985

(22) PCT Filed: Jan. 2, 2018

(86) PCT No.: PCT/EP2018/050016
§ 371 (c)(1),
(2) Date: Jun. 26, 2019

(87) PCT Pub. No.: WO2018/127472
PCT Pub. Date: Jul. 12, 2018

(65) Prior Publication Data
US 2021/0130506 A1 May 6, 2021

(30) Foreign Application Priority Data
Jan. 3, 2017 (EP) .................... 17150083

(51) Int. Cl.
| | |
|---|---|
| *C08F 2/01* | (2006.01) |
| *B01J 8/18* | (2006.01) |
| *B01J 19/24* | (2006.01) |
| *C08F 2/00* | (2006.01) |
| *C08F 2/14* | (2006.01) |
| *C08F 10/02* | (2006.01) |

(52) U.S. Cl.
CPC ............ *C08F 2/01* (2013.01); *B01J 8/1818* (2013.01); *B01J 19/245* (2013.01); *C08F 2/001* (2013.01); *C08F 2/14* (2013.01); *C08F 10/02* (2013.01)

(58) Field of Classification Search
USPC .......................................... 526/65
See application file for complete search history.

(56) References Cited

U.S. PATENT DOCUMENTS

| | | |
|---|---|---|
| 6,204,345 B1 | 3/2001 | Berthold et al. |
| 2015/0259446 A1 | 9/2015 | Senol et al. |
| 2017/0001167 A1 | 1/2017 | Bhandarkar et al. |
| 2017/0183427 A1 | 6/2017 | Kuehl et al. |

(Continued)

FOREIGN PATENT DOCUMENTS

| | | |
|---|---|---|
| CN | 105121001 A | 12/2015 |
| EP | 2740748 A1 | 6/2014 |
| WO | 2005077992 A1 | 8/2005 |

(Continued)

OTHER PUBLICATIONS

The PCT Search Report and the Written Opinion for PCT/EP2018/050016 dated Apr. 25, 2018.

*Primary Examiner* — Fred M Teskin (57) ABSTRACT

A slurry polymerization process for the preparation of polyethylene in a reactor cascade of two or more polymerization reactors wherein monomers are polymerized in the polymerization reactors which include a reactor outlet arranged in each reactor bottom for feeding a reactor slurry to a subsequent polymerization reactor and for emptying the polymerization reactor.

20 Claims, 1 Drawing Sheet

(56) References Cited

U.S. PATENT DOCUMENTS

2018/0022842 A1   1/2018  Meier et al.

FOREIGN PATENT DOCUMENTS

| WO | 2012028591 | A1 | 3/2012 |
| WO | 2015177014 | A1 | 11/2015 |
| WO | 20150165861 | A1 | 11/2015 |
| WO | 2016023973 | A1 | 2/2016 |

MULTI-REACTOR SLURRY POLYMERIZATION PROCESS

FIELD OF THE INVENTION

In general, the present disclosure relates to the field of chemistry. More specifically, the present disclosure relates to polymer chemistry. In particular, the present disclosure relates to a process for ethylene polymerization. More particularly, the present disclosure relates to a multi-reactor slurry polymerization process.

BACKGROUND OF THE INVENTION

During certain intervals, stirred tank reactors of reactor cascades used for slurry polymerization are subject to maintenance work. In some instances, the maintenance work results from the failure of reactor equipment such as reactor slurry pumps. In those instances, the multi-reactor slurry polymerization is stopped and at least one of the polymerization reactors are emptied. In some instances, emptying of polymerization reactors is caused by cleaning operations. The cleaning operations may result from reactor fouling, statutory inspections or other reasons. In many instances, polymeric material from the last reactor of the reactor cascade can be isolated and fit the commercial product specification. In many instances, the polymeric material from the upstream polymerization reactors represent off-spec material, which is not suited for further manufacturing steps such as extrusion or injection molding. As a consequence, the polymeric material from the upstream polymerization reactors is disposed of and treated as waste or converted into a grade which was actually not intended to be produced.

SUMMARY OF THE INVENTION

In a general embodiment, the present disclosure provides multi-reactor slurry polymerization processes for the preparation of polyethylene in a reactor cascade of two or more polymerization reactors.

In a general embodiment, the present disclosure provides a slurry polymerization process for the preparation of polyethylene in a reactor cascade of two or more polymerization reactors wherein monomers are polymerized in a polymerization reactor at a temperature from 20° C. to 200° C. and a pressure from 0.1 MPa to 20 MPa in the presence of a catalyst, ethylene, diluent and optionally hydrogen and further optionally amounts of one or more $C_3$ to $C_{10}$ alpha-olefin comonomers in a reactor slurry, thereby forming the polyethylene,
wherein the reactor cascade including
a first polymerization reactor including (1a) a reactor wall having an inner reactor wall surface, (1b) a reactor bottom connected to the reactor wall, (1c) a reactor head connected to the reactor wall, (1d) an internal reactor volume of the first polymerization reactor formed by the reactor wall, the reactor bottom and the reactor head, (1e) an agitator for mixing the contents of the internal reactor volume, (1f) a first reactor outlet arranged in the reactor wall for feeding a reactor slurry made from or containing diluent, catalyst, polymer, unreacted monomer and optionally dissolved hydrogen to a cooler or to a second polymerization reactor through a reactor discharge line, (1g) a second reactor outlet arranged in the reactor bottom for feeding a reactor slurry made from or containing diluent, catalyst, polymer, unreacted monomer and optionally dissolved hydrogen to a second polymerization reactor and for emptying the first polymerization reactor, and (1h) a first reactor inlet for returning cooled slurry from the cooler as a first reactor slurry stream;
a second polymerization reactor including (2a) a reactor wall having an inner reactor wall surface, (2b) a reactor bottom connected to the reactor wall, (2c) a reactor head connected to the reactor wall, (2d) an internal reactor volume of the second polymerization reactor formed by the reactor wall, the reactor bottom and the reactor head, (2e) an agitator for mixing the contents of the internal reactor volume, (2f) a first reactor outlet arranged in the reactor wall for feeding a reactor slurry made from or containing diluent, catalyst, polymer, unreacted monomer and optionally dissolved hydrogen to a cooler or to a third polymerization reactor through a reactor discharge line, (2g) a second reactor outlet arranged in the reactor bottom for feeding a reactor slurry made from or containing diluent, catalyst, polymer, unreacted monomer and optionally dissolved hydrogen to a third polymerization reactor and/or for emptying the second polymerization reactor, and (2h) a first reactor inlet for returning cooled slurry from the cooler as a first reactor slurry stream and optionally for feeding a second reactor slurry stream from the first polymerization reactor, and optionally (2i) a second reactor inlet for feeding a second reactor slurry stream from the first polymerization reactor;
optionally a third polymerization reactor including (3a) a reactor wall having an inner reactor wall surface, (3b) a reactor bottom connected to the reactor wall, (3c) a reactor head connected to the reactor wall, (3d) an internal reactor volume of the third polymerization reactor formed by the reactor wall, the reactor bottom and the reactor head, (3e) an agitator for mixing the contents of the internal reactor volume, (3f) a first reactor outlet arranged in the reactor wall for feeding a reactor slurry made from or containing diluent, catalyst, polymer, unreacted monomer and optionally dissolved hydrogen to a cooler or to an additional polymerization reactor through a reactor discharge line, (3g) a second reactor outlet arranged in the reactor bottom for feeding a reactor slurry made from or containing diluent, catalyst, polymer, unreacted monomer and optionally dissolved hydrogen to an additional polymerization reactor and/or for emptying the third polymerization reactor, and (3h) a first reactor inlet for returning cooled slurry from the cooler as a first reactor slurry stream and optionally for feeding a second reactor slurry stream from the second polymerization reactor, and optionally (3i) a second reactor inlet for feeding a second reactor slurry stream from the second polymerization reactor; and
further optionally an additional polymerization reactor including (4a) a reactor wall having an inner reactor wall surface, (4b) a reactor bottom connected to the reactor wall, (4c) a reactor head connected to the reactor wall, (4d) an internal reactor volume of the additional polymerization reactor formed by the reactor wall, reactor bottom and reactor head, (4e) an agitator for mixing the contents of the internal reactor volume, (4f) a first reactor outlet arranged in the reactor wall for feeding a reactor slurry made from or containing diluent, catalyst, polymer, unreacted monomer and optionally dissolved hydrogen to a cooler or to another additional polymerization reactor through a reactor discharge line, (4g) a second reactor outlet arranged in the reactor bottom for feeding a reactor slurry made from or containing diluent, catalyst, polymer, unreacted monomer and optionally dissolved hydrogen to another additional polymerization reactor and/or for emptying the additional polymerization reactor, and (4h) a first reactor inlet for returning cooled slurry from the cooler as a first reactor slurry stream and optionally for feeding a second reactor slurry stream from the third polymerization reactor, and optionally (4i) a second reactor inlet for feeding a second reactor slurry stream from the third polymerization reactor; and wherein the polymerization includes the steps of:

a) contacting, in the first polymerization reactor, the amounts of ethylene, catalyst, diluent and optionally hydrogen and optionally the $C_3$ to $C_{10}$ alpha-olefin comonomers, thereby forming a slurry product made from or containing particulate polyethylene and a suspension medium;

b) optionally withdrawing the slurry product from the first polymerization reactor through the first reactor outlet and, after having passed the cooler, feeding the slurry product to the first polymerization reactor of the reactor cascade through first polymerization reactor's first reactor inlet;

c) optionally withdrawing the slurry product from the first polymerization reactor through the first reactor outlet and feeding the slurry product to the second polymerization reactor of the reactor cascade through second polymerization reactor's first or second reactor inlet;

d) withdrawing the slurry product from the first polymerization reactor through the second reactor outlet and feeding the slurry product withdrawn through the second reactor outlet to the second polymerization reactor of the reactor cascade through second polymerization reactor's first or second reactor inlet, e) optionally feeding to the second polymerization reactor additional amounts of ethylene and/or diluent and optionally additional amounts of hydrogen and/or $C_3$ to $C_{10}$ alpha-olefin comonomers;

f) contacting, in the second polymerization reactor, the slurry product fed to the second polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;

g) optionally withdrawing the slurry product from the second polymerization reactor through the first reactor outlet and, after having passed the cooler, feeding the slurry product to the second polymerization reactor of the reactor cascade through second polymerization reactor's first reactor inlet; and h1) withdrawing the slurry product from the second polymerization reactor through the first reactor outlet and isolating the particulate polyethylene from the suspension medium and optionally emptying the second polymerization reactor through second polymerization reactor's second reactor outlet and isolating the particulate polyethylene from the suspension medium; or h2) withdrawing the slurry product from the second polymerization reactor through the first reactor outlet and feeding the slurry product to the third polymerization reactor of the reactor cascade through third polymerization reactor's first or second reactor inlet and/or withdrawing the slurry product from the second polymerization reactor through the second reactor outlet and feeding the slurry product withdrawn through the second reactor outlet to the third polymerization reactor of the reactor cascade through third polymerization reactor's first or second reactor inlet, i) optionally feeding to the third polymerization reactor additional amounts of ethylene and/or diluent and optionally additional amounts of hydrogen and/or $C_3$ to $C_{10}$ alpha-olefin comonomers;

j) contacting, in the third polymerization reactor, the slurry product fed to the third polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;

k) optionally withdrawing the slurry product from the third polymerization reactor through the first reactor outlet and, after having passed the cooler, feeding the slurry product to the third polymerization reactor of the reactor cascade through third polymerization reactor's first reactor inlet; and l) withdrawing the slurry product from the third polymerization reactor through the first reactor outlet and isolating the particulate polyethylene from the suspension medium and optionally emptying the third polymerization reactor through third polymerization reactor's second reactor outlet and isolating the particulate polyethylene from the suspension medium.

In some embodiments, the process of the present disclosure further includes the following steps following step 1), m) withdrawing the slurry product from the third polymerization reactor through the first reactor outlet and feeding the slurry product to the additional polymerization reactor of the reactor cascade through additional polymerization reactor's first reactor inlet, and/or withdrawing the slurry product from the third polymerization reactor through the second reactor outlet and feeding the slurry product withdrawn through the second reactor outlet to the additional polymerization reactor of the reactor cascade through additional polymerization reactor's first or second reactor inlet, n) optionally feeding to the additional polymerization reactor additional amounts of ethylene and/or diluent and optionally additional amounts of hydrogen and/or $C_3$ to $C_{10}$ alpha-olefin comonomers;

o) contacting in the additional polymerization reactor the slurry product fed to the additional polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;

p) optionally withdrawing the slurry product from the additional polymerization reactor through the first reactor outlet and, after having passed the cooler, feeding the slurry product to the additional polymerization reactor of the reactor cascade through additional polymerization reactor's first reactor inlet;

q) withdrawing the slurry product from the additional polymerization reactor through the first reactor outlet and isolating the particulate polyethylene from the suspension medium and optionally emptying the additional polymerization reactor through additional polymerization reactor's second reactor outlet and isolating the particulate polyethylene from the suspension medium, r) optionally repeating steps m) to q) for additional polymerization reactors of the reactor cascade.

In some embodiments, monomers are polymerized in a polymerization reactor at a temperature from 60° C. to 95° C. and a pressure from 0.15 MPa to 3.0 MPa.

In some embodiments, the first reactor outlet of the first polymerization reactor and/or the first reactor outlet of the second polymerization reactor are located in the upper two thirds of the reactor wall.

In some embodiments, the amounts of ethylene, catalyst, diluent and optionally hydrogen and optionally the $C_3$ to $C_{10}$ alpha-olefin comonomers are fed to the first polymerization reactor, to the second polymerization reactor, to the optional third polymerization reactor and to any optional additional polymerization reactor through the reactor bottom of the polymerization reactor.

In some embodiments, the reactor cascade further includes one or more flashing vessels. In some embodiments, the process includes the steps of (s) feeding the slurry product withdrawn from the first, second, third or additional polymerization reactor through the first reactor outlet before being fed to the subsequent polymerization reactor of the reactor cascade through subsequent polymerization reactor's first or second reactor inlet to the flashing vessel, (t) subjecting the slurry product to a flashing step and (u) feeding the flashed slurry product to the subsequent polymerization reactor of the reactor cascade.

In some embodiments, the reactor cascade further includes a flash vessel pump downstream of each flashing vessel.

In some embodiments, the slurry product withdrawn from the first, second, third or additional polymerization reactor through the second reactor outlet is fed to the reactor discharge line on the suction side of the flash vessel pump through a connecting line.

In some embodiments, feeding of catalyst, ethylene, hydrogen and of $C_3$ to $C_{10}$ alpha-olefin comonomers to a polymerization reactor is stopped before emptying the polymerization reactor through the second reactor outlet.

In some embodiments, feeding of catalyst, ethylene, hydrogen and of $C_3$ to $C_{10}$ alpha-olefin comonomers to the second polymerization reactor is stopped when the first polymerization reactor is empty, or feeding of catalyst, ethylene, hydrogen and of $C_3$ to $C_{10}$ alpha-olefin comonomers to the third polymerization reactor is stopped when the second polymerization reactor is empty, or feeding of catalyst, ethylene, hydrogen and of $C_3$ to $C_{10}$ alpha-olefin comonomers to the additional polymerization reactor is stopped when the third polymerization reactor is empty.

In some embodiments, during emptying of a polymerization reactor through the second reactor outlet, the agitator for mixing the contents of the internal reactor volume of the polymerization reactor is stirred.

In some embodiments, the reactor cascade further includes one or more slurry discharge control valves arranged in one or more of the reactor discharge lines and wherein the velocity of the discharge of the slurry product from a polymerization reactor is controlled by adjusting the slurry discharge control valve arranged downstream of the first and second reactor outlets of the polymerization reactor. In some embodiments, the discharge of the slurry product is controlled via the discharge control valve by putting the control valve from automatic mode to manual mode and maintaining the same opening. In some embodiments, the surface level of the slurry product inside the first reactor decreases linearly. In some embodiments, the discharge of the slurry product is controlled with a constant velocity for decreasing the surface level of the slurry product. In some embodiments, the constant velocity is accomplished by switching from automatic to manual mode. In some embodiments, upon having switched from automatic to manual mode, the velocity by which the surface level of the slurry product decreases is at least initially kept constant.

In some embodiments, during emptying of a polymerization reactor through the second reactor outlet, the velocity of the discharge of the slurry product is held constant.

In some embodiments, the reactor cascade system has two or three polymerization reactors.

In some embodiments, the two, three or more polymerization reactors of the reactor system are operated in series.

In some embodiments, the slurry product of the first polymerization reactor is emptied into the second polymerization reactor through the second reactor outlet of the first polymerization reactor, and wherein the slurry product of the second polymerization reactor is emptied through the second reactor outlet of the second polymerization reactor, optionally into the third polymerization reactor, and wherein the slurry product of the third polymerization reactor is emptied through the second reactor outlet of the third polymerization reactor, optionally into the additional polymerization reactor.

In some embodiments, the process of the present disclosure further includes the steps of (v) feeding the slurry product withdrawn from the first, second, third or additional polymerization reactor through the first reactor outlet before being fed to the subsequent polymerization reactor of the reactor cascade through the subsequent polymerization reactor's first or second reactor inlet to a separator, (w) separating in the separator the particulate polyethylene from the suspension medium, (x) recycling at least a part of the suspension medium separated from the slurry product in the separator as recycled suspension medium, and (y) feeding the separated particulate polyethylene and/or the recycled suspension medium to the subsequent polymerization reactor of the reactor cascade.

In some embodiments, the diluent fed to the first polymerization reactor of the reactor cascade is fresh diluent.

In some embodiments, the flow rate of hydrogen to the subsequent polymerization reactor is adjusted to maintain the hydrogen/ethylene partial pressure ratio at a targeted hydrogen/ethylene partial pressure ratio by adjusting the pressure in the flashing vessel.

In some embodiments, the polyethylene produced by the process has a density in the range of from 0.935 g/cm$^3$ to 0.97 g/cm$^3$.

In some embodiments, the catalyst is selected from Phillips catalysts, Ziegler type catalysts or single-site catalysts.

In some embodiments, the one or more comonomers are fed to the polymerization reactor and the flow rates of the comonomers to the polymerization reactor are adjusted to maintain the comonomer/ethylene partial pressure ratios at targeted comonomer/ethylene partial pressure ratios.

In some embodiments, the comonomers are selected from the group consisting of 1-butene, 1-pentene, 1-hexene, 1-octene or mixtures thereof.

In some embodiments, the cooler is a heat exchanger.

In some embodiments, the process of the present disclosure is optimized with respect to emptying one or more polymerization reactors of a reactor cascade.

BRIEF DESCRIPTION OF THE DRAWINGS

To assist those of ordinary skill in the relevant art in making and using the subject matter hereof, reference is made to the appended drawings, wherein:

The FIGURE depicts a flow diagram illustrating a multi-reactor ethylene slurry cascade polymerization process for producing polyethylene.

DETAILED DESCRIPTION OF THE INVENTION

Figure 1:
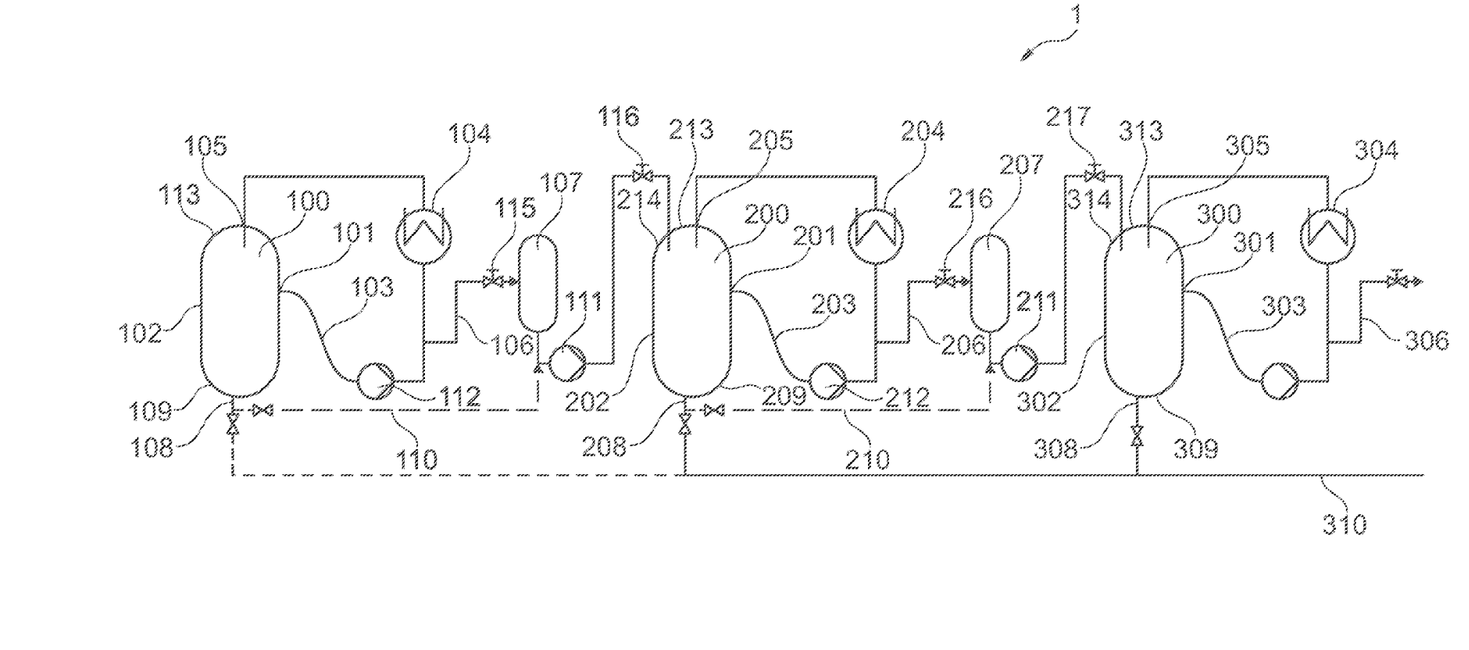

It should be understood that the use of "and/or" is defined inclusively, such that the term "a and/or b" should be read to include the sets: "a and b", "a or b", "a", "b". The term "and" in most cases "a and/or b" relates to two entities "a" and "b", wherein at least one of the entities is present in the embodiment described.

In some embodiments, it should also be understood that a particulate material has a mean particle diameter of from 50 μm to 3000 μm.

It should be noted that terms as "upper", "top" or "above" as well as "lower", "head", "bottom" or "below" refer to the arrangement of elements in the facility as assembled and as used and in accordance with the gravitational force of earth. Thus, a bottom section is closer to the center of earth than a top section. In some embodiments, this does not preclude a non-usable stage, wherein the arrangement deviates during transportation of a disassembled facility to the installation site.

In some embodiments, the method is about a slurry polymerization process for the preparation of polyethylene in a reactor cascade of two or more polymerization reactors wherein monomers are polymerized in a polymerization reactor at a temperature from 20° C. to 200° C. and a pressure from 0.1 MPa to 20 MPa in the presence of a catalyst, ethylene, diluent and optionally hydrogen and further optionally amounts of one or more $C_3$ to $C_{10}$ alpha-olefin comonomers in the reactor slurry, thereby forming the polyethylene, wherein the reactor cascade including:

a first polymerization reactor including (1a) a reactor wall having an inner reactor wall surface, (1b) a reactor bottom connected to the reactor wall, (1c) a reactor head connected to the reactor wall, (1d) an internal reactor volume of the first polymerization reactor formed by the reactor wall, the reactor bottom and the reactor head, (1e) an agitator for mixing the contents of the internal reactor volume, (1f) a first reactor outlet arranged in the reactor wall for feeding a reactor slurry made from or containing diluent, catalyst, polymer, unreacted monomer and optionally dissolved hydrogen to a cooler or to a second polymerization reactor through a reactor discharge line, (1g) a second reactor outlet arranged in the reactor bottom for feeding a reactor slurry made from or containing diluent, catalyst, polymer, unreacted monomer and optionally dissolved hydrogen to a second polymerization reactor and for emptying the first polymerization reactor, and (1h) a first reactor inlet for returning cooled slurry from the cooler as a first reactor slurry stream;

a second polymerization reactor including (2a) a reactor wall having an inner reactor wall surface, (2b) a reactor bottom connected to the reactor wall, (2c) a reactor head connected to the reactor wall, (2d) an internal reactor volume of the second polymerization reactor formed by the reactor wall, the reactor bottom and the reactor head, (2e) an agitator for mixing the contents of the internal reactor volume, (2f) a first reactor outlet arranged in the reactor wall for feeding a reactor slurry made from or containing diluent, catalyst, polymer, unreacted monomer and optionally dissolved hydrogen to a cooler or to a third polymerization reactor through a reactor discharge line, (2g) a second reactor outlet arranged in the reactor bottom for feeding a reactor slurry made from or containing diluent, catalyst, polymer, unreacted monomer and optionally dissolved hydrogen to a third polymerization reactor and/or for emptying the second polymerization reactor, and (2h) a first reactor inlet for returning cooled slurry from the cooler as a first reactor slurry stream and optionally for feeding a second reactor slurry stream from the first polymerization reactor, and optionally (2i) a second reactor inlet for feeding a second reactor slurry stream from the first polymerization reactor; and a third polymerization reactor including (3a) a reactor wall having an inner reactor wall surface, (3b) a reactor bottom connected to the reactor wall, (3c) a reactor head connected to the reactor wall, (3d) an internal reactor volume of the third polymerization reactor formed by the reactor wall, the reactor bottom and the reactor head, (3e) an agitator for mixing the contents of the internal reactor volume, (3f) a first reactor outlet arranged in the reactor wall for feeding a reactor slurry made from or containing diluent, catalyst, polymer, unreacted monomer and optionally dissolved hydrogen to a cooler or to an additional polymerization reactor through a reactor discharge line, (3g) a second reactor outlet arranged in the reactor bottom for feeding a reactor slurry made from or containing diluent, catalyst, polymer, unreacted monomer and optionally dissolved hydrogen to an additional polymerization reactor and/or for emptying the third polymerization reactor, and (3h) a first reactor inlet for returning cooled slurry from the cooler as a first reactor slurry stream and optionally for feeding a second reactor slurry stream from the second polymerization reactor, and optionally (3i) a second reactor inlet for feeding a second reactor slurry stream from the second polymerization reactor; and wherein the polymerization includes the steps of:

a) contacting, in the first polymerization reactor, the amounts of ethylene, catalyst, diluent and optionally hydrogen and optionally the $C_3$ to $C_{10}$ alpha-olefin comonomers, thereby forming a slurry product made from or containing particulate polyethylene and a suspension medium;

b) withdrawing the slurry product from the first polymerization reactor through the first reactor outlet and, after having passed the cooler, feeding the slurry product to the first polymerization reactor of the reactor cascade through first polymerization reactor's first reactor inlet;

c) withdrawing the slurry product from the first polymerization reactor through the first reactor outlet and feeding the slurry product to the second polymerization reactor of the reactor cascade through second polymerization reactor's first or second reactor inlet;

d) withdrawing the slurry product from the first polymerization reactor through the second reactor outlet and feeding the slurry product withdrawn through the second reactor outlet to the second polymerization reactor of the reactor cascade through second polymerization reactor's first or second reactor inlet, e) optionally feeding to the second polymerization reactor additional amounts of ethylene and/or diluent and optionally additional amounts of hydrogen and/or $C_3$ to $C_{10}$ alpha-olefin comonomers;

f) contacting, in the second polymerization reactor, the slurry product fed to the second polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;

g) withdrawing the slurry product from the second polymerization reactor through the first reactor outlet and, after having passed the cooler, feeding the slurry product to the second polymerization reactor of the reactor cascade through second polymerization reactor's first reactor inlet; and h2) withdrawing the slurry product from the second polymerization reactor through the first reactor outlet and feeding the slurry product to the third polymerization reactor of the reactor cascade through third polymerization reactor's first or second reactor inlet, and withdrawing the slurry product from the second polymerization reactor through the second reactor outlet and feeding the slurry product withdrawn through the second reactor outlet to the third polymerization reactor of the reactor cascade through third polymerization reactor's first or second reactor inlet, i) optionally feeding to the third polymerization reactor additional amounts of ethylene and/or diluent and optionally additional amounts of hydrogen and/or $C_3$ to $C_{10}$ alpha-olefin comonomers;

j) contacting, in the third polymerization reactor, the slurry product fed to the third polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;

k) withdrawing the slurry product from the third polymerization reactor through the first reactor outlet and, after having passed the cooler, feeding the slurry product to the third polymerization reactor of the reactor cascade through third polymerization reactor's first reactor inlet;

l) withdrawing the slurry product from the third polymerization reactor through the first reactor outlet and isolating the particulate polyethylene from the suspension medium and emptying the third polymerization reactor through third polymerization reactor's second reactor outlet and isolating the particulate polyethylene from the suspension medium.

In some embodiments, the reactor slurry is withdrawn from the first polymerization reactor, the second polymerization reactor and optionally the third polymerization reactor through the first reactor outlet of the first polymerization reactor, through the first reactor outlet of the second polymerization reactor and optionally through the first reactor outlet of the third polymerization reactor using reactor slurry pumps. Such reactor slurry pumps allow feeding the reactor slurry to an external cooler and then back to the respective polymerization reactor and further partly transferring the slurry to subsequently arranged polymerization reactors or to a subsequently arranged separation device in which the suspension medium is separated from the solid particulate polyethylene.

In some embodiments, to ensure that the reactor slurry pumps do not get defected, cavitation in the pumps is avoided. In some embodiments, the defect was potentially by a failure of the seals. In some embodiments, cavitation is avoided in pumps by arranging the inlet of the suction line of the pump at a higher position than the pump. Consequently, in some embodiments, the first reactor outlet of the first polymerization reactor and/or the first reactor outlet of the second polymerization reactor and optionally the first reactor outlet of the third polymerization reactor are located in the upper two thirds of the reactor wall. In some embodiments, the first reactor outlets are located in the upper half of the reactor walls.

In some embodiments, the amounts of ethylene, catalyst, diluent and optionally hydrogen and optionally the $C_3$ to $C_{10}$ alpha-olefin comonomers are fed to the first polymerization reactor, to the second polymerization reactor, to the optional third polymerization reactor and to any optional additional polymerization reactor through the reactor bottom of the respective polymerization reactor.

In some embodiments, monomers are polymerized in a polymerization reactor at a temperature from 60° C. to 95° C. and a pressure from 0.15 MPa to 3.0 MPa, alternatively at temperatures from 70° C. to 85° C., and at reactor pressures from 0.15 MPa to 3 MPa, alternatively from 0.2 MPa to 2 MPa, alternatively from 0.25 MPa to 1.5 MPa.

Upon exiting the last polymerization reactor of the reactor cascade, the slurry made from or containing solid polyolefin particles and a diluent are mechanically separated. In some embodiments, the slurry product withdrawn from the last polymerization reactor of the reactor cascade is fed to a separator, which separates the particulate polyethylene from the suspension medium. In some embodiments, at least a part of the suspension medium separated from the slurry product in the separator is recycled as diluent to one or more polymerization reactors of the reactor cascade. In some embodiments and subsequently, the polyolefin particles obtained are subjected to a drying step furnishing a polyolefin powder.

In some embodiments, the polyethylene polymers obtained by the process are ethylene homopolymers or copolymers of ethylene containing up to 40 wt. % of $C_3$-$C_8$-1-alkenes. In some embodiments, the comonomers are chosen from 1-butene, 1-pentene, 1-hexene, 1-octene or mixtures thereof. In some embodiments, ethylene is copolymerized with up to 20 wt. % of 1-butene, 1-hexene, or mixtures thereof.

In some embodiments, the polymerization reactors of the reactor cascade represent stirred tank reactors.

In some embodiments, the polymerization in a polymerization reactor of a reactor cascade is conducted in a batchwise manner. That means, the polymerization takes place in a medium, the suspension medium, which is in liquid or in supercritical state under the conditions in the respective polymerization reactor and in which the produced polyolefin is insoluble and forms solid particles. In some embodiments, the solids content of the slurry is in the range of from 10 to 80 wt.-%, alternatively in the range of from 20 to 40 wt.-%.

In some embodiments, the suspension medium, which forms the liquid or supercritical phase of the slurry, is made from or contains, as main component, a diluent which is made from or contains further components such as dissolved monomers or comonomers, dissolved cocatalysts or scavengers like aluminum alkyls, solved reaction auxiliaries like hydrogen or dissolved reaction products of the polymerization reaction like oligomers or waxes. As such, the suspension medium is not the fed suspension medium alone but rather a mixture of the fed suspension medium with the monomers dissolved therein. In some embodiments, the ethylene concentration is determined by gas-chromatographic analysis of the suspension medium.

In some embodiments, the diluents are inert, which do not decompose under reaction conditions. In some embodiments, the diluents are hydrocarbons having from 3 to 12 carbon atoms, alternatively saturated hydrocarbons like isobutane, butane, propane, isopentane, pentane, hexane or octane, or a mixture of these. In some embodiments, unsaturated hydrocarbons such as the monomers are used as diluent. In some embodiments, the monomer is propylene. In some embodiments, the diluent has a boiling point which is different from those of the monomers and comonomers used to permit recovery of these starting materials from a mixture. In some embodiments, the recovery occurs by distillation. In some embodiments, the diluents are hydrocarbons having a boiling point above 40° C., alternatively above 60° C., or mixtures made from or containing a high proportion of these hydrocarbons. In some embodiments, the polymerization takes place in a liquid suspension medium made from or containing more than 50 wt. % of saturated hydrocarbons having a boiling point of above 60° C. at 0.1 MPa, alternatively more than 80 wt.-% of saturated hydrocarbons having a boiling point of above 60° C. at 0.1 MPa.

In some embodiments, diluent fed to the reactor is fresh diluent, recycled suspension medium separated from the particulate polyethylene in the reactor slurry and then directly recycled, or combinations thereof. In some embodiments, the fresh diluent is new, unprocessed material or diluent previously separated from the reactor slurry that has been processed to remove impurities. In some embodiments, the removed impurities are low boiling components or waxes. In some embodiments, any combination of recycled suspension medium and fresh diluent is fed to the polymerization reactors in a multi-reactor system when operating in series.

In some embodiments, the polymerization is carried out using Phillips catalysts based on chromium oxide, using titanium-based Ziegler- or Ziegler-Natta-catalysts, or using single-site catalysts. For the purposes of the present disclosure, single-site catalysts are catalysts based on chemically uniform transition metal coordination compounds. In some embodiments, the single-site catalysts are made from or contain bulky sigma- or pi-bonded organic ligands or catalysts based on late transition metal complexes. In some embodiments, the single-site catalysts are based on mono-Cp complexes or bis-Cp complexes, which are designated as metallocene catalysts. In some embodiments, the catalysts based on late transition metal complexes are iron-bisimine complexes. In some embodiments, mixtures of two or more of these catalysts are used for the polymerization of olefins. In some embodiments, the mixed catalysts are designated as hybrid catalysts.

In some embodiments, the catalysts are of the Ziegler type. In some embodiments, the Ziegler-type catalysts are made from or contain a compound of titanium or vanadium, a compound of magnesium and optionally a particulate inorganic oxide as support.

In some embodiments, the resulting polymers are bimodal or multimodal polyolefins. As used herein, the terms "bimodal" and "multimodal" refer to the modality of the molecular weight distribution. In some embodiments and in addition to the molecular weight distribution, the polyolefin have a comonomer distribution. In some embodiments, the average comonomer content of polymer chains with a higher molecular weight is higher than the average comonomer content of polymer chains with a lower molecular weight. As used herein, the term "multimodal" includes "bimodal". In some embodiments, the polyethylene polymers are bimodal or trimodal.

In some embodiments, the polyolefins are obtained as powder that means in form of small particles. In some embodiments, the particles have a regular morphology and size, depending on the catalyst morphology and size, and on polymerization conditions. In some embodiments and depending on the catalyst used, the particles of the polyolefin powder have a mean diameter of from a few hundred to a few thousand micrometers. In some embodiments and in the case of chromium catalysts, the mean particle diameter is from about 300 to about 1600 μm. In some embodiments and in the case of Ziegler type catalysts, the mean particle diameter is from about 50 to about 3000 μm. In some embodiments, polyolefin powders have a mean particle diameter of from 100 to 250 μm.

In some embodiments, the polyolefins are polyethylenes having an ethylene content of from 50 to 100 wt. %, alternatively from 80 to 100 wt. %, alternatively from 98 to 100 wt. %. In some embodiments, the content of other olefins in the polyethylenes is from 0 to 50 wt. %, alternatively from 0 to 20 wt. %, alternatively from 0 to 2 wt. %.

In some embodiments, the density of polyethylene compositions is from 0.90 $g/cm^3$ to 0.97 $g/cm^3$, alternatively from 0.920 to 0.968 $g/cm^3$, alternatively from 0.945 to 0.965 $g/cm^3$. The density is determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the polyethylenes have a MFR216 at a temperature of 190° C. under a load of 21.6 kg, determined according to DIN EN ISO 1133:2005, condition G, of from 0.5 to 300 g/10 min, alternatively from 1 to 100 g/10 min, alternatively from 1.2 to 100 g/10 min, alternatively from 1.5 to 50 g/10 min.

Further features and advantages of the present disclosure will become apparent from the following description, in which exemplary embodiments of the disclosure are explained with reference to schematic drawings, by way of example and without limiting the invention.

Reference is now made to the FIGURE which illustrates an embodiment of the process of the present disclosure, as a three-reactor system 1 running in series as a cascade. The polymerization is carried out in three polymerization reactors 100, 200 and 300. Each of the reactors is equipped with a mixing unit including a motor, a rotating shaft and impellers (not shown).

Catalyst, ethylene and optionally 1-butene as comonomer are fed via separate lines (not shown) and/or hydrogen is dosed via another line (not shown) to the first reactor. Reactor slurry is withdrawn from reactor 100 through the first reactor outlet 101 arranged in the reactor wall 102 via line 103 and routed for external cooling through cooler 104, aided by cooler pump 112, and then back to polymerization reactor 100 through the first reactor inlet 105 arranged at the reactor head 113. Reactor slurry withdrawn from reactor 100 via line 103 is further partly transferred through line 106, which includes a flash vessel 107, to the second reactor 200 via second reactor inlet 214.

The polyethylene particles contained in the slurry transferred to reactor 200 are made from or contain still active catalyst which continues to polymerize ethylene and, if present, comonomer in the second reactor 200. Again, ethylene and optionally 1-butene as comonomer and/or hydrogen are transferred to the second reactor through separate lines (not shown). Reactor slurry is withdrawn from reactor 200 through the first reactor outlet 201 arranged in the reactor wall 202 via line 203 and routed for external cooling through cooler 204, aided by cooler pump 212, and then back to polymerization reactor 200 through first reactor inlet 205 arranged at the reactor head 213. Reactor slurry withdrawn from the second reactor 200 via line 203 is further partly transferred through line 206, which further includes a flash vessel 207, to the third reactor 300 via second reactor inlet 314.

In some instances, polyethylene particles contained in the slurry transferred to the third reactor 300 of the reactor cascade are made from or contain still active catalyst which continues to polymerize ethylene and, if present, comonomer in reactor 300. Accordingly, ethylene and optionally 1-butene and/or hydrogen are dosed to the third reactor 300 through separate lines (not shown). Reactor slurry is withdrawn from reactor 300 through the first reactor outlet 301 arranged in the reactor wall 302 via line 303 and routed for external cooling through cooler 304 and then back to the third polymerization reactor 300 through first reactor inlet 305 arranged at the reactor head 313. Reactor slurry withdrawn from the third reactor 300 via line 303 is further partly transferred through line 306 to a separation device (not shown). In some embodiments, the third reactor 300 includes a flash vessel, cooling devices and/or other vessels (not shown).

In the separation device, the suspension medium is separated from the solid particulate polyethylene. The polyethylene is directed to a finishing section for further processing, including without limitation hydrocarbons removal and compounding. In some embodiments, recycled suspension medium is directly routed back to the ethylene slurry polymerization reactors 100, 200 and/or 300 and/or routed to a holding tank (not shown).

To empty the first reactor 100, the slurry product is transferred through the second reactor outlet 108 arranged in the bottom 109 of the first reactor 100 via dashed line 110 which enters into line 106 downstream of the flash vessel 107 and upstream of a flash vessel pump 111. In some embodiments, the slurry product has a surface level below the first reactor outlet 101. Accordingly, the reactor discharge line 110 is connected to the suction side of the flash vessel pump 111.

Further, after the first reactor 100 is completely discharged of the slurry product via the second reactor outlet 108, emptying of the second reactor 200 starts. The slurry product is transferred through the second reactor outlet 208 arranged in the bottom 209 of the second reactor 200 via dashed line 210 which enters into line 206 downstream of the flash vessel 207 and upstream of a flash vessel pump 211. In some embodiments, the slurry product has a surface level below the first reactor outlet 201. Accordingly, the reactor discharge line 210 is connected to the suction side of the flash vessel pump 211.

After the second reactor 200 is completely discharged of the slurry product via the second reactor outlet 208, emptying of the third reactor 300 starts. In the third reactor 300, the slurry content is on-spec so that the slurry product which cannot be discharged through the first reactor outlet 301 but which due to having a surface level below the first reactor outlet 301 has to be transferred through the second reactor outlet 308 arranged in the bottom 309 of the third reactor 300 and via line 310 contains or yields after work up on-spec polymeric product.

The dotted section of line 310 between the first and the second reactor is optional. In some embodiments, the dotted part of line 310 is used for emergency purposes, for emptying part or all of the content of the first reactor containing off-spec material. In some embodiments, if on-spec material is produced in the second reactor without off-spec material remaining, the section of line 310 following the dotted section is used to discharge on-spec material from the second reactor via the second reactor outlet 208.

The polymerization conditions are controlled such that the polymerization in the first reactor 100 of the reactor cascade is stopped, ethylene, catalyst, hydrogen and comonomers are no longer fed to the first reactor 100, when the first reactor is emptied through the second reactor outlet 108. As a result, the surface level of the slurry is decreasing. In some embodiments and when slurry product is not transferred via the first reactor outlet 101 to the cooler 104, transfer to the cooler is stopped and the second reactor outlet 108 is opened. In some embodiments, transfer to the cooler is stopped by the cooler pump 112. During emptying via the second reactor outlet 108, the velocity of the discharge of the slurry product is controlled via control valve 116 by putting that control valve from automatic mode to manual mode and initially maintaining the same opening to safeguard that the surface level of the slurry product inside the first reactor 100 decreases linearly. In some embodiments and for emptying the first reactor, the differential pressure by flash vessel pump 111 is utilized. During emptying the first reactor 100 into the second reactor 200, polymerization proceeds in the second and third polymerization reactors 200 and 300, respectively. The second reactor 200 is emptied into the third reactor 300 in the same manner as described for the first reactor 100. Again, control valve 217 is employed to control the velocity of the discharge of the slurry product. In some embodiments and when the second reactor 200 is empty, ethylene, catalyst, hydrogen and comonomers are no longer fed to the third reactor 300.

In some embodiments and as the top of the reactors are equipped with gas analyzers, the right velocity of slurry transfer is monitored by the gas composition. In some embodiments and via adjusting the opening of the control valve 116 and 217 respectively, the constant reactor composition in the reactor is facilitated.

Other features, advantages and embodiments of the subject matter of the present disclosure disclosed herein will be readily apparent to those exercising ordinary skill after reading the foregoing disclosure. In this regard, while specific embodiments of the subject matter of the present disclosure have been described in considerable detail, variations and modifications of these embodiments can be effected without departing from the spirit and scope of the disclosure as described and claimed.

The invention claimed is:

1. A slurry polymerization process for the preparation of polyethylene in a reactor cascade of two or more polymerization reactors wherein monomers are polymerized in a polymerization reactor at a temperature from 20° C. to 200° C. and a pressure from 0.1 MPa to 20 MPa in the presence of a catalyst, ethylene, diluent and optionally hydrogen and further optionally amounts of one or more $C_3$ to $C_{10}$ alpha-olefin comonomers in a reactor slurry, thereby forming the polyethylene, wherein the reactor cascade comprising:

a first polymerization reactor comprising: (1a) a reactor wall comprising an inner reactor wall surface, (1b) a reactor bottom connected to the reactor wall, (1c) a reactor head connected to the reactor wall, (1d) an internal reactor volume of the first polymerization reactor formed by the reactor wall, the reactor bottom and the reactor head, (1e) an agitator for mixing the contents of the internal reactor volume, (1f) a first reactor outlet arranged in the reactor wall for feeding a reactor slurry comprising diluent, catalyst, polymer, unreacted monomer and optionally dissolved hydrogen to a cooler or to a second polymerization reactor through a reactor discharge line, (1g) a second reactor outlet arranged in the reactor bottom for feeding a reactor slurry comprising diluent, catalyst, polymer, unreacted monomer and optionally dissolved hydrogen to a second polymerization reactor and for emptying the first polymerization reactor, and (1h) a first reactor inlet for returning cooled slurry from the cooler as a first reactor slurry stream;

a second polymerization reactor comprising (2a) a reactor wall comprising an inner reactor wall surface, (2b) a reactor bottom connected to the reactor wall, (2c) a reactor head connected to the reactor wall, (2d) an internal reactor volume of the second polymerization reactor formed by the reactor wall, the reactor bottom and the reactor head, (2e) an agitator for mixing the contents of the internal reactor volume, (2f) a first reactor outlet arranged in the reactor wall for feeding a reactor slurry comprising diluent, catalyst, polymer, unreacted monomer and optionally dissolved hydrogen to a cooler or to a third polymerization reactor through a reactor discharge line, (2g) a second reactor outlet arranged in the reactor bottom for feeding a reactor slurry comprising diluent, catalyst, polymer, unreacted monomer and optionally dissolved hydrogen to a third polymerization reactor and/or for emptying the second polymerization reactor, and (2h) a first reactor inlet for returning cooled slurry from the cooler as a first reactor slurry stream and optionally for feeding a second reactor slurry stream from the first polymerization reactor, and optionally (2i) a second reactor inlet for feeding a second reactor slurry stream from the first polymerization reactor;

optionally a third polymerization reactor comprising (3a) a reactor wall comprising an inner reactor wall surface, (3b) a reactor bottom connected to the reactor wall, (3c) a reactor head connected to the reactor wall, (3d) an internal reactor volume of the third polymerization reactor formed by the reactor wall, the reactor bottom and the reactor head, (3e) an agitator for mixing the contents of the internal reactor volume, (3f) a first reactor outlet arranged in the reactor wall for feeding a reactor slurry comprising diluent, catalyst, polymer, unreacted monomer and optionally dissolved hydrogen to a cooler or to an additional polymerization reactor through a reactor discharge line, (3g) a second reactor outlet arranged in the reactor bottom for feeding a reactor slurry comprising diluent, catalyst, polymer, unreacted monomer and optionally dissolved hydrogen to an additional polymerization reactor and/or for emptying the third polymerization reactor, and (3h) a first reactor inlet for returning cooled slurry from the cooler as a first reactor slurry stream and optionally for feeding a second reactor slurry stream from the second polymerization reactor, and optionally (3i) a second reactor inlet for feeding a second reactor slurry stream from the second polymerization reactor; and further optionally an additional polymerization reactor comprising (4a) a reactor wall comprising an inner reactor wall surface, (4b) a reactor bottom connected to the reactor wall, (4c) a reactor head connected to the reactor wall, (4d) an internal reactor volume of the additional polymerization reactor formed by the reactor wall, the reactor bottom and the reactor head, (4e) an agitator for mixing the contents of the internal reactor volume, (4f) a first reactor outlet arranged in the reactor wall for feeding a reactor slurry comprising diluent, catalyst, polymer, unreacted monomer and optionally dissolved hydrogen to a cooler or to another additional polymerization reactor through a reactor discharge line, (4g) a second reactor outlet arranged in the reactor bottom for feeding a reactor slurry comprising diluent, catalyst, polymer, unreacted monomer and optionally dissolved hydrogen to another additional polymerization reactor and/or for emptying the additional polymerization reactor, and (4h) a first reactor inlet for returning cooled slurry from the cooler as a first reactor slurry stream and optionally for feeding a second reactor slurry stream from the third polymerization reactor, and optionally (4i) a second reactor inlet for feeding a second reactor slurry stream from the third polymerization reactor; and wherein the polymerization comprises the steps of:
a) contacting, in the first polymerization reactor, the amounts of ethylene, catalyst, diluent and optionally hydrogen and optionally the $C_3$ to $C_{10}$ alpha-olefin comonomers, thereby forming a slurry product comprising particulate polyethylene and a suspension medium;
b) optionally withdrawing the slurry product from the first polymerization reactor through the first reactor outlet and, after having passed the cooler, feeding the slurry product to the first polymerization reactor of the reactor cascade through first polymerization reactor's first reactor inlet;
c) optionally withdrawing the slurry product from the first polymerization reactor through the first reactor outlet and feeding the slurry product to the second polymerization reactor of the reactor cascade through second polymerization reactor's first or second reactor inlet;
d) withdrawing the slurry product from the first polymerization reactor through the second reactor outlet and feeding the slurry product withdrawn through the second reactor outlet to the second polymerization reactor of the reactor cascade through second polymerization reactor's first or second reactor inlet,
e) optionally feeding to the second polymerization reactor additional amounts of ethylene and/or diluent and optionally additional amounts of hydrogen and/or $C_3$ to $C_{10}$ alpha-olefin comonomers;
f) contacting, in the second polymerization reactor, the slurry product fed to the second polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;
g) optionally withdrawing the slurry product from the second polymerization reactor through the first reactor outlet and, after having passed the cooler, feeding the slurry product to the second polymerization reactor of the reactor cascade through second polymerization reactor's first reactor inlet; and
h1) withdrawing the slurry product from the second polymerization reactor through the first reactor outlet and isolating the particulate polyethylene from the suspension medium and optionally emptying the second polymerization reactor through second polymerization reactor's second reactor outlet and isolating the particulate polyethylene from the suspension medium; or
h2) withdrawing the slurry product from the second polymerization reactor through the first reactor outlet and feeding the slurry product to the third polymerization reactor of the reactor cascade through third polymerization reactor's first or second reactor inlet and/or
  withdrawing the slurry product from the second polymerization reactor through the second reactor outlet and feeding the slurry product withdrawn through the second reactor outlet to the third polymerization reactor of the reactor cascade through third polymerization reactor's first or second reactor inlet,
i) optionally feeding to the third polymerization reactor additional amounts of ethylene and/or diluent and optionally additional amounts of hydrogen and/or $C_3$ to $C_{10}$ alpha-olefin comonomers;
j) optionally contacting, in the third polymerization reactor, the slurry product fed to the third polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;

k) optionally withdrawing the slurry product from the third polymerization reactor through the first reactor outlet and, after having passed the cooler, feeding the slurry product to the third polymerization reactor of the reactor cascade through third polymerization reactor's first reactor inlet; and l) Optionally withdrawing the slurry product from the third polymerization reactor through the first reactor outlet and isolating the particulate polyethylene from the suspension medium and optionally emptying the third polymerization reactor through third polymerization reactor's second reactor outlet and isolating the particulate polyethylene from the suspension medium.

2. The process of claim 1, further comprising the follow steps following step l), m) withdrawing the slurry product from the third polymerization reactor through the first reactor outlet and feeding the slurry product to the additional polymerization reactor of the reactor cascade through additional polymerization reactor's first reactor inlet, and/or withdrawing the slurry product from the third polymerization reactor through the second reactor outlet and feeding the slurry product withdrawn through the second reactor outlet to the additional polymerization reactor of the reactor cascade through additional polymerization reactor's first or second reactor inlet, n) optionally feeding to the additional polymerization reactor additional amounts of ethylene and/or diluent and optionally additional amounts of hydrogen and/or $C_3$ to $C_{10}$ alpha-olefin comonomers;

o) contacting in the additional polymerization reactor the slurry product fed to the additional polymerization reactor and optionally the additional amounts of ethylene and/or diluent and optionally hydrogen and/or $C_3$ to $C_{10}$ alpha-olefin comonomers, thereby forming an additional amount of polyethylene in the slurry product;

p) optionally withdrawing the slurry product from the additional polymerization reactor through the first reactor outlet and, after having passed the cooler, feeding the slurry product to the additional polymerization reactor of the reactor cascade through additional polymerization reactor's first reactor inlet;

q) withdrawing the slurry product from the additional polymerization reactor through the first reactor outlet and isolating the particulate polyethylene from the suspension medium and
optionally emptying the additional polymerization reactor through additional polymerization reactor's second reactor outlet and isolating the particulate polyethylene from the suspension medium;

r) optionally repeating steps m) to q) for additional polymerization reactors of the reactor cascade.

3. The process of claim 1, wherein the first reactor outlet of the first polymerization reactor and/or the first reactor outlet of the second polymerization reactor are located in the upper two thirds of the reactor wall.

4. The process of claim 1, wherein the amounts of ethylene, catalyst, diluent and optionally hydrogen and optionally the $C_3$ to $C_{10}$ alpha-olefin comonomers are fed to the first polymerization reactor, to the second polymerization reactor, and to the optional third polymerization reactor through the reactor bottom of the polymerization reactor.

5. The process of claim 1, wherein the reactor cascade further comprises one or more flashing vessels, and wherein the process further comprises the steps of (s) feeding the slurry product withdrawn from the first, second, or third polymerization reactor through the first reactor outlet before being fed to the subsequent polymerization reactor of the reactor cascade through subsequent polymerization reactor's first or second reactor inlet to the flashing vessel, (t) subjecting the slurry product to a flashing step and (u) feeding the flashed slurry product to the subsequent polymerization reactor of the reactor cascade.

6. The process of claim 5, wherein the reactor cascade further comprises a flash vessel pump downstream of each flashing vessel.

7. The process of claim 6, wherein the slurry product withdrawn from the first, second, or third polymerization reactor through the second reactor outlet is fed to the reactor discharge line on the suction side of the flash vessel pump through a connecting line.

8. The process of claim 1, wherein feeding of catalyst, ethylene, hydrogen and of $C_3$ to $C_{10}$ alpha-olefin comonomers to a polymerization reactor is stopped before emptying of the polymerization reactor through the second reactor outlet.

9. The process of claim 1, wherein feeding of catalyst, ethylene, hydrogen and of $C_3$ to $C_{10}$ alpha-olefin comonomers to the second polymerization reactor is stopped when the first polymerization reactor is empty, or feeding of catalyst, ethylene, hydrogen and of $C_3$ to $C_{10}$ alpha-olefin comonomers to the third polymerization reactor is stopped when the second polymerization reactor is empty.

10. The process of claim 1, wherein, during emptying of a polymerization reactor through the second reactor outlet, the agitator for mixing the contents of the internal reactor volume of the polymerization reactor is stirred.

11. The process of claim 1, wherein the reactor cascade further comprises one or more slurry discharge control valves arranged in one or more of the reactor discharge lines and wherein the velocity of the discharge of the slurry product from a polymerization reactor is controlled by adjusting the slurry discharge control valve arranged downstream of the first and second reactor outlets of the polymerization reactor.

12. The process of claim 1, wherein, during emptying of a polymerization reactor through the second reactor outlet, the velocity of the discharge of the slurry product is held constant.

13. The process of claim 1, wherein the slurry product of the first polymerization reactor is emptied into the second polymerization reactor through the second reactor outlet of the first polymerization reactor, and wherein the slurry product of the second polymerization reactor is emptied through the second reactor outlet of the second polymerization reactor, optionally into the third polymerization reactor.

14. The process of claim 1, further comprising the steps of (v) feeding the slurry product withdrawn from the first, second, or third polymerization reactor through the first reactor outlet before being fed to the subsequent polymerization reactor of the reactor cascade through the subsequent polymerization reactor's first or second reactor inlet to a separator, (w) separating in the separator the particulate polyethylene from the suspension medium, (x) recycling at least a part of the suspension medium separated from the slurry product in the separator as recycled suspension medium, and (y) feeding the separated particulate polyethylene and/or the recycled suspension medium to the subsequent polymerization reactor of the reactor cascade.

15. A process for emptying a polymerization reactor comprising the slurry polymerization process of claim 1.

16. The process of claim 2, wherein the amounts of ethylene, catalyst, diluent and optionally hydrogen and optionally the C3 to C10 alpha-olefin comonomers are fed to the first polymerization reactor, to the second polymerization reactor, to the optional third polymerization reactor, and to the optional additional polymerization reactor through the reactor bottom of the polymerization reactor.

17. The process of claim 2, wherein the reactor cascade further comprises one or more flashing vessels, and wherein the process further comprises the steps of (s) feeding the slurry product withdrawn from the first, second, third or additional polymerization reactor through the first reactor outlet before being fed to the subsequent polymerization reactor of the reactor cascade through subsequent polymerization reactor's first or second reactor inlet to the flashing vessel, (t) subjecting the slurry product to a flashing step and (u) feeding the flashed slurry product to the subsequent polymerization reactor of the reactor cascade.

18. The process of claim 17, wherein the reactor cascade further comprises a flash vessel pump downstream of each flashing vessel.

19. The process of claim 18, wherein the slurry product withdrawn from the first, second, third or additional polymerization reactor through the second reactor outlet is fed to the reactor discharge line on the suction side of the flash vessel pump through a connecting line.

20. The process of claim 2, wherein feeding of catalyst, ethylene, hydrogen and of C3 to C10 alpha-olefin comonomers to the second polymerization reactor is stopped when the first polymerization reactor is empty, or feeding of catalyst, ethylene, hydrogen and of C3 to C10 alpha-olefin comonomers to the third polymerization reactor is stopped when the second polymerization reactor is empty, or feeding of catalyst, ethylene, hydrogen and of C3 to C10 alpha-olefin comonomers to the additional polymerization reactor is stopped when the third polymerization reactor is empty.

\* \* \* \* \*

UNITED STATES PATENT AND TRADEMARK OFFICE
CERTIFICATE OF CORRECTION

| | | |
|---|---|---|
| PATENT NO. | : 11,525,017 B2 | Page 1 of 1 |
| APPLICATION NO. | : 16/473985 | |
| DATED | : December 13, 2022 | |
| INVENTOR(S) | : Rohrbach et al. | |

It is certified that error appears in the above-identified patent and that said Letters Patent is hereby corrected as shown below:

In the Specification

In Column 1, Line 3, after "MULTI-REACTOR SLURRY POLYMERIZATION PROCESS" insert -- This application is the U.S. National Phase of PCT International Application PCT/EP2018/050016, filed January 2, 2018, claiming benefit of priority to European Patent Application No. 17150083.8, filed January 3, 2017, the disclosures of which are incorporated herein by reference in their entirety. --

In Column 12, Line 11, delete "MFR216" and insert -- $MFR_{21.6}$ --, therefor

Signed and Sealed this
Twenty-third Day of January, 2024

Katherine Kelly Vidal
*Director of the United States Patent and Trademark Office*